United States Patent
Gray

(10) Patent No.: US 8,631,323 B1
(45) Date of Patent: Jan. 14, 2014

(54) UPDATING THE DISPLAY TREATMENT OF SOURCE CODE BASED ON A REAL TIME SEMANTIC AND SYNTACTIC ANALYSIS

(75) Inventor: Theodore W. Gray, Champaign, IL (US)

(73) Assignee: Wolfram Research, Inc., Champaign, IL (US)

(*) Notice: Subject to any disclaimer, the term of this patent is extended or adjusted under 35 U.S.C. 154(b) by 1415 days.

(21) Appl. No.: 11/788,193

(22) Filed: Apr. 18, 2007

(51) Int. Cl.
*G06F 9/44* (2006.01)

(52) U.S. Cl.
USPC ............................ 715/255; 717/112; 717/113

(58) Field of Classification Search
None
See application file for complete search history.

(56) References Cited

U.S. PATENT DOCUMENTS

| 4,617,643 A * | 10/1986 | Klock et al. | 715/273 |
| 5,513,305 A * | 4/1996 | Maghbouleh | 715/234 |
| 5,813,019 A * | 9/1998 | Van De Vanter | 715/236 |
| 2003/0221186 A1 * | 11/2003 | Bates et al. | 717/125 |

OTHER PUBLICATIONS

Mäkelä, S. & Leppänen, V. 2004, "Program Code Emphasizing Tool for Learning Basic Programming Concepts", Proceedings of the Fourth Baltic Sea Conference on Computer Science Education, eds. A. Korhonen & L. Malmi.*

Lorimer, R.J.; "Eclipse: Advanced Syntax Highlighting"; Nov. 15, 2004; Javalobby; availabe at "http://www.javalobby.org/forums/thread.jspa?threadID=15586".*

* cited by examiner

*Primary Examiner* — Stephen Hong
*Assistant Examiner* — Asher Kells
(74) *Attorney, Agent, or Firm* — Workman Nydegger

(57) ABSTRACT

In a computing environment, a method for treating display characteristics of input displayed via a user interface includes receiving input from a user interface, the input including at least one character, determining the scope of the input, categorizing input into at least one category, and applying at least one display treatment to the input associated with at least one category, wherein the display treatment is applied as each character is received from the user interface.

21 Claims, 14 Drawing Sheets
(6 of 14 Drawing Sheet(s) Filed in Color)

WarpedBeamedPlatonicSolid[*plato*: (Tetrahedron | Hexahedron | Octahedron |
Dodecahedron | Icosahedron),
    *faceSubdivision_ Integer*? Positive,    — 306
    *lateralContractionFactor_*? (0 < # < 1 &),
    *radialContractionFactor_*? (0 < # < 1 &),
310
    *plotPoints*: {*PPQ_Integer*? Positive,
    *ppl_ Integer*?Positive},
    *outwardStcetchingFactor_* ?Positive] :=
300
Module[{*normalize, triangles, smaallerTriangles, outerBeamPolygons, outerBeamLines,
contractj, radialEdqes, outerPlatoEdqes*},
(\* normalizing a vector \*)
*normalize* = # /Sqrt [#.# ] &;  — 308
*triangles* =
Flatten[Function[{*x*}, { {#[[-1]], Plus@@ # /2, *x*[[-1]]},
    (Last[#], Plus @@ #/2, *x*[[-1]])} & /@ *x*[[1]]] /@
    ({Partition[append[#,# [[1]]],2,1],
        Plus @@ # / Lenqth[#]}&) /@
            Map[*normalize*, First/@
                Polyhedron[*plato*][[1]], {-2}], 2];
*smallerTriangles* = Nest[Flatten[apply[Function[{*x, y, x*},
      ({{*x, #, y*}, {*x, #, y*}} &)[
    (*x* + (*y - x*).# #&)[*normalize*[*z - x*]]], #, (1)], 1] &, *triangles, faceSubdivision*];
*outerBeamPolygons* =
Apply[Function[*p1, p2, p3*},
Module[{*mp* = (*p1* + *p2* + p3) /3, *p1i, p2i, p3i*),
    {*p1i, p2i, p3i*} =
    (*mp + lateralContractionFactor* (# - *mp*)) & /@ {*p1, p2, p3*};
    Apply [Function[{*q1, q1i, q2i, q2*},
    Function[*pointNet*,
    Table[Polygon[{*pointNet*[[ i, j ]], *pointNet*[[ i + 1, j ]],
        *PointNet*[[i + 1, j + 1]], *pointNet*[[i, j + 1]]}],
    (i, *ppl*), (j, *ppq*)]]]
Table[*q1* + ix /*ppl* (*q2 - q1*) + (1 - ix / *ppl*) iy/ *ppq* (*q1z - q1*) +
    ix / *ppl* iy /*ppq* (*q2i* - q2)
314 ——▶ (ix, 0, *ppl*), {iy, 0, *ppq*)]]],
  {{*pl, pli, p2i, p2*}, {*p2, p2i, p3i, p3*}, (*p3, p3i, pli, pl*)},
  {1}]]], *smallerTriangles*, {1}];
*outerBeamLines* = Apply[Function[{*pl, p2, p3*},
Module[{*mp* = (*p1 + p2* + p3)/3, *pli, p2i, p3i*),
  {*pli, p2i, p3i*} =
  (*mp + lateralContractionFactor* (# - *mp*» & /@ {*p1, p2,p3*};
Line[Join@@ (Table[# [[1]] + i/ *ppl*(#[[2]] _ #[[1]]),
    {i, 0, *ppl*)]& /@
  {{*pli, p2i*}, {*p2i, p3i*}, {*p3i, pli*})]]],
  *smallerTriangles*, {1}];
*contract*[*x_*] =

Fig. 3A

```
Module [{xMin, xMax, xm,, dx},
    {xMax, xMin} = Sqrt[{Max[#], Min[#]}&[#.# & /@
            Level [smallerTriangles, {-2}]]];
    xm, = (xMin + xMax) /2; dx = xMax - xm,;
    Evaluate // @Re[If [x < xm, Sqrt[1- ( x - xm,) ^2 / dx ^2],
            outwardstretchingFactor*
                (1 - Sqrt[1 - (1-( x - xm) ^2/dx ^2]) + 1]]];
Contract[x_List] ; = x /Sqrt [x.x] contract [Sqrt [x, x] ];
radialEdges = Apply[Function [ {p1, p2, p3},
Module[{mp = (p1 + p2 + p3) /3, p1t, p2t, p3t, p1tfm p2tf, p3tf},
    {p1t, p2t, p3t} =
            (mp+lateralContractionFactor (# - mp»&/@ {p1, p2, p3};
    {p1tf, p2tf, p3tf} = contract /@ {p1t, p2t, p3t};
    {Line [p1tf, radialContractionFactorp1tf}],
    Line [{p2tf, radialContractionFactorp2tf}],
    Line [ {p3tradialContractionFactorp3tf}] }]],
    smallerTriangles, {1}];
outerPlatoEdges =
Map [1. 0001 contract [#] &,
    Line[Table[# [[1]] + i /100 (# [[2]] - # [[1]]), (1, 0, 100)]]& /@
        Map [# /Sqrt [#. #] &, Flatten[Map [H[Vertices [plato] [[#]]] &,
    Partition[Append[#, # [[1]]], 2, 1] & /@
            Faces[plato], {-1}], 1], {-2}], {-2}];
```

312 → Warp [f_, polys_, edges_, thickness_] :=
Module[ {1- First I@ Map[f, edges, {-2}],
    P = First /@Map[f, Flatten[polys], {-2}],
        outerPolys, innerPolys, radialPolys, outerEdges, innerEdges},
    outerpolys = Polygon /@ p;
    innerPolys = Polygon /@ Map [radialContractionFactor # &, p, {-2}];
    radialPolys = Polyqon /@ (Join[# [[1]], Reverse [#[[2]]]] &) /@
            Transpose[{Flatten[Partition[#, 2, 1]& /@]1, 1],
                Flatten[Partition[#, 2, 1] & /@
            Map[radialContractionFactor # &, 1, {-2}], 1]}];
    outerEdges = Line /@ 1;
    innerEdges = Line /@Map[radialContractionFactor # &, 1, {-2}];
    {outer Polys, innerPolys, radialPolys, outerEdges, innerEdges}];
Show[Graphics3D[
{EdgeForm[], Thickness [0 ,001], radialEdges, outerPlatoEdges,
warp [contract, outerBeamPolygons, outerBeamLines,
    radialContractionFactor]} /,
Polygon[l_] :> {Function[c, SurfaceColor[c, c, 2.8]][
            Hue[0.25 + 0.5 Sqrt[#. #] & [Plus @@ l/4]1
                (1 + outwardStrechingFactor)]],
Polygon[l]}], PlotRange - > All, Boxed -1 False]]

Fig. 3B

```
WarpedBeamedPlatonicSolid[plato: (Tetrahedron I Hexahedron I Octahedron I
        Dodecahedron I Icosahedron),
        faceSubdivision_ Integer? Positive,
        lateralContractionFactor_? (0 < # < 1 &),
        radialContractionFactor_? (0 < # < 1 &),
        plotPoint: {ppq_Interger ? Positive,
        ppl_Integer?Positive},
        outwardStretchingFactor_ ?Positive] :=
Module [ {normalize, triangles, smallerTriangles, outerBeamPolygons,
        outerBeamLines, contract, radialEdges, outerPlatoEdges}
(* normalizing a vector *)
normalize = # /Sqrt [# .#] &;
triangles =
Flatten[Function[{x}, {{#[[1]], Plus@@ # /2, x[[-1]]},
        {Last[#], Plus @@ # /2, x [[-1]]}} & /@ x [[1]]] /@
        ({Partition[Append[#, # [[1]]], 2, 1],
        Plus @@ # / Length[#] } &) /@
                Map [normalize, First /@
                        Polyhedron[plato][[1]], {-2}], 2];
smallerTriangles = Nest[Flatten[apply[Function[{x, y, x},
        {{{x, #, y}, {x, #, y}} &)[
        (x + (y - x(.# # &)[normalize[z - x]]], # (1)], 1] &,
400 ──────────▶  triangles, faceSubdivision];
outerBeamPolygons =
Apply[Function[{p1,p2,p3},
Module[{mp = (p1 +p2+p3)/3, p1i, p2i, p3i},
        {p1i, p2i, p3i} =
        (mp - lateralContractionFactor (# - mp)) & /@ {p1, p2, p3};
        Apply[Function[{q1, q1t, q1r, q2},
                Function[pointNet,
                Table[Polygon[{pointNet[[i, j]], pointNet[[i + 1, j]],
                        PointNet[[i + 1, j + 1]], PointNet[[i, j + 1]]}],
                (i, ppl), (j, ppq)]][
                Table[q1 + ix /ppl (q2 - q1) + (1 - ix / ppl) iy /ppq (q1r - q1) +
                        ix / ppl iy/ ppq (q2t - q2),
                (ix, 0, ppl), {iy, 0, ppq)]]],
        {{p1, p1i, p2i, p2}, {p2, p2i, p3i, p3}, {p3, p3i, p1i, p1}},
                {1}]]], smallerTriangles, {1}];
outerBeamLines = Apply[Function[{p1, p2, p3},
Module[{mp = (p1 + p2 + p3)/3, p1i, p2i, p3i..),
        {p1i, p2i, p3i} =
        (mp + lateralContractionFactor (# - mp)) & /@ {p1, p2, p3};
        Line[Join@@ (Table[#[[1]] + i /ppl(#[[2]] _ #[[1]]),
                {i, 0,ppl)]& /@
                {{p1i, p2i}, {p2i, p3i}, {p3i, p1i}})]]],
        smallerTriangles, {1}];
contract[x_] =
Module [{xMin, xMax, xm, dx},
        {xMax, xMin} _ Sqrt[{Max[#], Min[#]}&[#.# & /@
                Level [smallerTriangles, {-2}]]];
        xm_ (xMin + xMax) /2; dx _ xMax - xm;
        Evaluate //@Re[If[x < xm, Sqrt[1- (x _ xm) ^2 / dx^2],
                outwardStretchingFactor*
                        (1 - Sqrt[1 - (x - xm) ^2/dx ^2]) + 1]]];
```

Fig. 4A

```
contract[x_List] := x /Sqrt [x.x] contract [Sqrt [x. x] ];
radialEdqes = Apply[Function[ {p1, p2, p3},
Module[{mp = (p1 + p2 + p3) /3, p1i, p2i, p3ip1if,p2if,p3if},
    {p1i, p2i, p3i} =
            (mp+lateralContractionFactor (#-mp »&!@ {p1,p2,p3});
    {p1if, p2if, p3if} = contract /@ {p1i, p2i, p3i};
    {Line [{p1if, radialContractionFactor p1if}],
     Line [{p2if, radialContractionFactor p2if}],
     Line [{p3if, radialContractionFactor p3if}] }]],
     smallerTriangles, {1}];
outerPlatoEdqes =
Map [1.0001 contract [#] &,
    Line[Table[# [[1]] + i/100 (#[[2]] - # [[1]]), {i, 0, 100}]]& /@
        Map [# /Sqrt [#.# ] &, Flatten[Map [N[Vertices [plato] [[#]]] &,
    Partition[Append[#, # [[1]]], 2, 1] & /@
            Faces[plato], {-1}], 1], {-2}], {-2}];
warp[{f_,polys_, edges_, thickness_}] :=
Module[{l = First /@ Map[f, edges, {-2}],
    P = First /@Map[f, Flatten[polys], {-2}],
        outerPolys, innerPolys, radialPolys~ outerEdges, innerEdges},
outerpolys = Polygon /@ p;
innerPolys = Polygon /@ Map [radialContractionFactor # &, p, {-2}];
radialPolys = Polyqon /@ (Join[# [[1]], Reverse [# [[2]]]] &) /@
    Transpose[{Flatten[Partition[#, 2, 1]& /@ l, 1],
        Flatten[Partition[#, 2, 1] & /@
    Map[radialContractionFactor # &, 1, {-2}], 1]}];
outerEdqes = Line /@ 1;
inn.erEdges = Line /@Map[radialContractionFactor # &, 1, {-2}];
{outerPolys, innerPolys, radialPolys, outerEdges, innerEdges}];
Show[Graphics3D[
{EdgeForm[], Thickness [0 .001], radialEdqes,              Edqes,
warp [contract, outerBeamPolygons, outerBeamLines ]
    radialContractionFactor]} /,
Polygon[l_] :;.. {Function[c, SurfaceColor[c, c, 2.8]][
    Hue[0.25 + O5 Sqrt[#.#] & [Plus @@ l/4]]
        (1 + outwardStrechingFactor)]],
Polygon[2])], PlotRange -> All, Boxed -> False]]
```

Fig. 4B

- 306 • Misspelled words
  ~~Dodecahedron · Faces · Hexahedron · Icosahedron · Octohedron · Polyhedron · Tetrahedron · Vertices~~

- 308 • Comments
  ~~(\*) (\* a normalizing vector \* RowBox[{normalizing a vector}])~~

- 310 • Context-specific styling
  All· Append · Apply · Boxed ·EdgeForm · Evaluate
  · False · First · Flatten · Function · Graphics3D
  · Hue · If · Join · Last · Length· Level · Line
  · Map · Max · Min · Module · N · Nest · Partition
  · PlotRange · Plus · Polygon · Positive · Re·
  Reverse· Show· Sqrt · SurfaceColor · Table
  · Thickness · Transpose ·
  WarpedBeamedPlatonicSolid

- 410 / 312 • Global symbols that have no value assigned
  triangles □ warp □ x

- 314 • Variables made special by use in arguments
  i · ix · iy · j

- 316 • The local variables of Block, Module and With
  contract · dx · innerEdges · innerPolys · l ·
  mp · normalize · outerBeamLines ·
  outerBeamPolygons · outer Edges· outerPlatoEdges
  · outerPolys · p · pli · plif · p2i· p2if ·
  p3i · p3if · radialEdges · radialPolys ·
  smallerTriangles · triangles · xm · xMax ·
  xMin

Fig. 4C

```
WarpedBeamedPlatonicSolid[plato : (Tetrahedron | Hexahedron | Octahedron |
                Dodecahedron | Icosahedron),
            faceSubdivision_Integer?Positive,                              ← 506
            lateralContractionFactor_?(0 < # < 1 &),
            radialContractionFactor_?(0 < # < 1 &),
    510     plotPoints: {ppq_Integer?Positive,
            ppl_Integer?Positive},
            outwardStretchingFactor_?Positive] :=
Module[{normalize, triangles, smallerTriangles, outerBeamPolygons,
        outerBeamLines, contract, radialEdges, outerPlatoEdges},
    (* normalizing a vector *)
500 normalize = # / Sqrt[#.#] &;
    triangles =
    Flatten[Function[{x}, {{#[[1]], Plus @@ # / 2, x[[-1]]},
        {Last[#], Plus @@ # / 2, x[[-1]]}} & /@ x[[1]]] /@
        ({Partition[Append[#, #[[1]]], 2, 1],
            Plus @@ # / Length[#]} & /@
                Map[normalize, First /@
                    Polyhedron[plato][[1]], {-2}], 2];
    smallerTriangles = Nest[Flatten[Apply[Function[{x, y, z},
            ({{x, #, y}, {z, #, y}} &)[
        (x + (y - x).# #&)[normalize[z - x]]]], #, {1}], 1] &,
                triangles, faceSubdivision];
    outerBeamPolygons =
    Apply[Function[{p1, p2, p3},
    Module[{mp = (p1 + p2 + p3) / 3, p1i, p2i, p3i},
        {p1i, p2i, p3i} =
        (mp + lateralContractionFactor (# - mp)) & /@ {p1, p2, p3};
    Apply[Function[{q1, q1i, q2i, q2},
    Function[pointNet,
    Table[Polygon[{pointNet[[i, j]], pointNet[[i + 1, j]],
            pointNet[[i + 1, j + 1]], pointNet[[i, j + 1]]}],
        {i, ppl}, {j, ppq}]][
    Table[q1 + ix / ppl (q2 - q1) + (1 - ix / ppl) iy / ppq (q1i - q1) +
514 →           ix / ppl iy / ppq (q2i - q2)],
        {ix, 0, ppl}, {iy, 0, ppq}]]],
    {{p1, p1i, p2i, p2}, {p2, p2i, p3i, p3}, {p3, p3i, p1i, p1}},
    {1}]]], smallerTriangles, {1}];
    outerBeamLines = Apply[Function[{p1, p2, p3},
    Module[{mp = (p1 + p2 + p3) / 3, p1i, p2i, p3i},
        {p1i, p2i, p3i} =
        (mp + lateralContractionFactor (# - mp)) & /@ {p1, p2, p3};
    Line[Join @@ (Table[#[[1]] + i / ppl (#[[2]] - #[[1]]),
            {i, 0, ppl}] & /@
        ({p1i, p2i}, {p2i, p3i}, {p3i, p1i}))]]],
        smallerTriangles, {1}];
    contract[x_] =
```

Fig. 5A

```
Module[{xMin, xMax, xm, dx},
    {xMax, xMin} = Sqrt[{Max[#], Min[#]}&[#.# & /@
            Level[smallerTriangles, {-2}]]];
    xm = (xMin + xMax)/2; dx = xMax - xm;
    Evaluate //@ Re[If[x < xm, Sqrt[1 - (x - xm)^2/dx^2],
            outwardStretchingFactor *
            (1 - Sqrt[1 - (x - xm)^2/dx^2]) + 1]]];
contract[x_List] := x/Sqrt[x.x] contract[Sqrt[x.x]];
radialEdges = Apply[Function[{p1, p2, p3},
Module[{mp = (p1 + p2 + p3)/3, p1i, p2i, p3i, p1if, p2if, p3if},
    {p1i, p2i, p3i} =
     (mp + lateralContractionFactor (# - mp))& /@ {p1, p2, p3};
    {p1if, p2if, p3if} = contract /@ {p1i, p2i, p3i};
    {Line[{p1if, radialContractionFactor p1if}],
     Line[{p2if, radialContractionFactor p2if}],
     Line[{p3if, radialContractionFactor p3if}]}]],
    smallerTriangles, {1}];
outerPlatoEdges =
Map[1.0001 contract[#] &,
  Line[Table[#[[1]] + i/100 (#[[2]] - #[[1]]), {i, 0, 100}]] & /@
    Map[#/Sqrt[#.#] &, Flatten[Map[N[Vertices[plato][[#]]] &,
    Partition[Append[#, #[[1]]], 2, 1] & /@
          Faces[plato], {-1}], 1], {-2}], {-2}];
warp[f_, polys_, edges_, thickness_] :=
Module[{l = First /@ Map[f, edges, {-2}],
   p = First /@ Map[f, Flatten[polys], {-2}],
        outerPolys, innerPolys, radialPolys, outerEdges, innerEdges},
   outerPolys = Polygon /@ p;
   innerPolys = Polygon /@ Map[radialContractionFactor # &, p, {-2}];
   radialPolys = Polygon /@ (Join[#[[1]], Reverse[#[[2]]]] &) /@
       Transpose[{Flatten[Partition[#, 2, 1] & /@ l, 1],
           Flatten[Partition[#, 2, 1] & /@
          Map[radialContractionFactor # &, l, {-2}], 1]}];
   outerEdges = Line /@ l;
   innerEdges = Line /@ Map[radialContractionFactor # &, l, {-2}];
   {outerPolys, innerPolys, radialPolys, outerEdges, innerEdges}];
Show[Graphics3D[
{EdgeForm[], Thickness[0.001], radialEdges, outerPlatoEdges,
warp[contract, outerBeamPolygons, outerBeamLines,
  radialContractionFactor]} /.
  Polygon[l_] :> {Function[c, SurfaceColor[c, c, 2.8]][
          Hue[0.25 + 0.5 Sqrt[#.#] &[Plus @@ l/4]/
            (1 + outwardStretchingFactor)]],
       Polygon[l]}], PlotRange -> All, Boxed -> False]]
```

(512 annotation pointing to `warp[f_, polys_, edges_, thickness_] :=`)

Fig. 5B

```
WarpedBeamedPlatonicSolid[plato: (Tetrahedron | Hexahedron | Octahedron |
                Dodecahedron | Icosahedron),
        faceSubdivision_Integer?Positive,
        lateralContractionFactor_?(0 < # < 1&),
        radialContractionFactor_?(0 < # < 1&),
        plotPoints: {ppq_Integer?Positive,
        ppl_Integer?Positive},
        outwardStretchingFactor_?Positive] :=
Module[{normalize, triangles, smallerTriangles, outerBeamPolygons,
        outerBeamLines, contract, radialEdges, outerPlatoEdges},
(* normalizing a vector *)
normalize = # / Sqrt[#.#] &;
triangles =
Flatten[Function[{x}, ({#[[1]], Plus @@ #/2, x[[-1]]},
    {Last[#], Plus @@ #/2, x[[-1]]})& /@ x[[1]]] /@
    ({Partition[Append[#, #[[1]]], 2, 1],
        Plus @@ #/Length[#]}&) /@
            Map[normalize, First /@
            Polyhedron[plato][[1]], {-2}], 2];
smallerTriangles = Nest[Flatten[Apply[Function[{x, y, z},
        ({{x, #, y}, {z, #, y}}&)[
    (x + (y - x).# #&)[normalize[z - x]]]], #, {1}], 1] &,
                                                 riangles, faceSubdivision];
outerBeamPolygons =
Apply[Function[{p1, p2, p3},
Module[{mp = (p1 + p2 + p3)/3, p1i, p2i, p3i},
    {p1i, p2i, p3i} =
    (mp + lateralContractionFactor(# - mp))& /@ {p1, p2, p3};
Apply[Function[{q1, q1i, q2i, q2},
Function[pointNet,
Table[Polygon[{pointNet[[i, j]], pointNet[[i + 1, j]],
        pointNet[[i + 1, j + 1]], pointNet[[i, j + 1]]}],
    {i, ppl}, {j, ppq}]][
    Table[q1 + ix/ppl(q2 - q1) + (1 - ix/ppl)iy/ppq(q1i - q1) +
                ix/ppliy/ppq(q2i - q2),
        {ix, 0, ppl}, {iy, 0, ppq}]]],
{{p1, p1i, p2i, p2}, {p2, p2i, p3i, p3}, {p3, p3i, p1i, p1}},
{1}]]], smallerTriangles, {1}];
outerBeamLines = Apply[Function[{p1, p2, p3},
Module[{mp = (p1 + p2 + p3)/3, p1i, p2i, p3i},
    {p1i, p2i, p3i} =
    (mp + lateralContractionFactor(# - mp))& /@ {p1, p2, p3};
    Line[Join @@ (Table[#[[1]] + i/ppl(#[[2]] - #[[1]]),
            {i, 0, ppl}]& /@
        {{p1i, p2i}, {p2i, p3i}, {p3i, p1i}})]]],
    smallerTriangles, {1}];
contract[x_] =
```

```
Module[{xMin, xMax, xm, dx},
    {xMax, xMin} = Sqrt[{Max[#], Min[#]}&[#.#& /@
           Level[smallerTriangles, {-2}]]];
  xm = (xMin + xMax)/2; dx = xMax - xm;
  Evaluate //@ Re[If[x < xm, Sqrt[1 - (x - xm)^2/dx^2],
          outwardStretchingFactor *
          (1 - Sqrt[1 - (x - xm)^2/dx^2]) + 1]]];
contract[x_List] := x/Sqrt[x.x] contract[Sqrt[x.x]];
radialEdges = Apply[Function[{p1, p2, p3},
Module[{mp = (p1 + p2 + p3)/3, p1i, p2i, p3i, p1if, p2if, p3if},
  {p1i, p2i, p3i} =
   (mp + lateralContractionFactor (# - mp))& /@ {p1, p2, p3};
  {p1if, p2if, p3if} = contract /@ {p1i, p2i, p3i};
  {Line[{p1if, radialContractionFactor p1if}],
   Line[{p2if, radialContractionFactor p2if}],
   Line[{p3if, radialContractionFactor p3if}]}]],
  smallerTriangles, {1}];
outerPlatoEdges =
Map[1.0001 contract[#]&,
  Line[Table[#[[1]] + i/100 (#[[2]] - #[[1]]), {i, 0, 100}]]& /@
    Map[#/Sqrt[#.#]&, Flatten[Map[N[Vertices[plato][[#]]]&,
  Partition[Append[#, #[[1]]], 2, 1]& /@
        Faces[plato], {-1}], 1], {-2}], {-2}];
warp[f_, polys_, edges_, thickness_] :=
Module[{l = First /@ Map[f, edges, {-2}],
  p = First /@ Map[f, Flatten[polys], {-2}],
     outerPolys, innerPolys, radialPolys, outerEdges, innerEdges},
  outerPolys = Polygon /@ p;
  innerPolys = Polygon /@ Map[radialContractionFactor #&, p, {-2}];
  radialPolys = Polygon /@ (Join[#[[1]], Reverse[#[[2]]]]&) /@
    Transpose[{Flatten[Partition[#, 2, 1]& /@ l, 1],
        Flatten[Partition[#, 2, 1]& /@
          Map[radialContractionFactor #&, l, {-2}], 1]}];
  outerEdges = Line /@ l;
  innerEdges = Line /@ Map[radialContractionFactor #&, l, {-2}];
   {outerPolys, innerPolys, radialPolys, outerEdges, innerEdges}];
Show[Graphics3D[
{EdgeForm[], Thickness[0.001], radialEdges, outerPlatoEdges,
warp[contract, outerBeamPolygons, outerBeamLines,
  radialContractionFactor]} /.
 Polygon[l_] :> {Function[c, SurfaceColor[c, c, 2.8]][
         Hue[0.25 + 0.5 Sqrt[#.#]&[Plus @@ l/4]/
           (1 + outwardStretchingFactor)]],
       Polygon[l]}, PlotRange -> All, Boxed -> False]]
```

UPDATING THE DISPLAY TREATMENT OF SOURCE CODE BASED ON A REAL TIME SEMANTIC AND SYNTACTIC ANALYSIS

CROSS-REFERENCE TO RELATED APPLICATIONS

Not Applicable.

BACKGROUND OF THE INVENTION

1. The Field of the Invention

The present invention relates to user interfaces in computing systems. More particularly, embodiments of the invention relate to semantic syntax treatment.

2. The Relevant Technology

Software allows users to take advantage of the increasing power of computers for any number of applications. User interfaces often allow users to interact software running on a computer by allowing a user to view a representation of input as it is entered for use by the software, as well as permitting the user to view a representation of the output on the computer. This is often true in both the use of a computer program as well as in the writing and development of the program and in other uses of a computer.

In order to input commands and/or data for processing, text (such as ASCII characters) is usually entered into the computer. Matching terms within code are often desirable in order for the program to run properly or to yield the desired results. For example, if grouping parameters such as parentheses used to indicate an order of operation are not properly matched, a result may be returned or the result may not be what the programmer intended. Similarly, if variable names or assignments are not properly used, undesired values or errors may result.

In order to reduce such errors, some efforts have been made to indicate matching or errors with different colored text. For example, one approach indicates which parentheses are considered as matching by displaying matching parentheses in the same color. Other approaches change the color of mismatching variables after the programmer attempts to run the program. Such programs do not take into account the use of local variables and also do not allow the programmer to see errors until after the programmer is finished with the code.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY OF THE INVENTION

In a computing environment, a method for treating display characteristics of input displayed via a user interface includes receiving input from a user interface, the input including at least one character, determining the scope of the input, categorizing input into at least one category, and applying at least one display treatment to the input associated with at least one category, wherein the display treatment is applied as each character is received from the user interface.

Accordingly, embodiments of the invention provide the ability to determine the effect a character or string of characters has on the categorization of input within a determined scope, such as within a block or module of a program or within the entire program. The analysis of each local scope is usually performed more frequently than global evaluations.

In one example, the categorizations are updated with each keystroke or based another periodic or other basis. One benefit of embodiments of the invention is to provide a user with feedback regarding the program or code. Display treatments are associated with each category or a group of categories.

Embodiments of the invention perform a deep semantic analysis. As a result, there are a variety of different issues that can be identified. Thus, semantic coloring or other display treatments are not limited to identifying errors, but can also be used to identify other aspects of a program that are of interest to a user. By updating the semantic coloring or the semantic display treatment quickly, often as quickly as a user is providing input, the user can be aware of the status of his or her code. This can enable a user to more quickly identify errors rather than attempting to debug code after the code is generated. For example, a user inputting text can quickly ascertain certain aspects or properties of his or her code based on the semantic treatment. This can enable a user to quickly identify errors that would be difficult to identify or find without the display treatment.

This Summary is provided to introduce a selection of concepts in a simplified form that are further described in the Detailed Description section below. This Summary is not intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 3A-3C illustrate one example of the categorization of input and the corresponding semantic syntax treatment;

FIGS. 4A-4B illustrate one example of changes to the input and corresponding semantic syntax treatment of input according to one example;

FIG. 5A-5C illustrate one example of the categorization of input and the corresponding semantic syntax treatment in which the semantic syntax treatment include applying different colors to the text of input in each category; and FIGS. 6A-6C illustrate one example of changes to the input and corresponding semantic syntax treatment of input according to one example.

Figure 1:
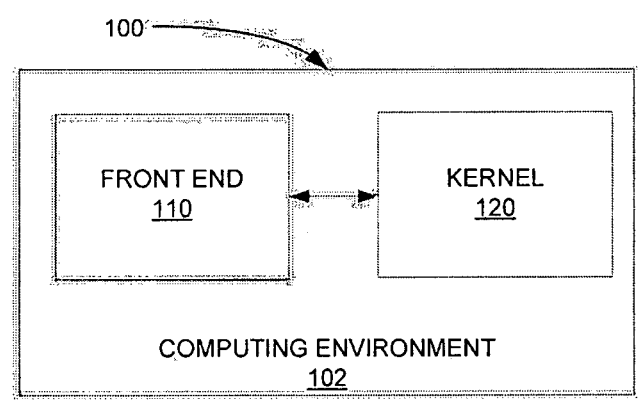
FIG. 1 illustrates a system for entering a program in which the input receives semantic syntax treatment according to one example.

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Embodiments of the invention relate to applying a display treatment to characters in a program and more particularly in the source code or during the development stage of a computer program. A semantic display treatment, such as a color scheme, can provide a user with visual feedback regarding the program.

Conventional programming environments often provide the ability to identify syntax error, such as a missing semicolon or an unmatched parenthesis, and the like. A syntax error often prevents the code from compiling in conventional programming environment. Embodiments of the invention, however, are directed to systems and methods that also enable semantic coloring. In this sense, conventional syntax coloring is more directed to the properties of a programming language or to structure while semantic coloring is more directed to the meaning of the programming language. In at least this sense, among others, semantic coloring differs substantially from syntax coloring systems.

In one example, semantic coloring is based on a parsed representation of the programming language rather than on an unparsed textual representation. When applying or generating a display treatment such as semantic coloring, embodiments of the invention apply a semantic analysis to the program as a whole or at least to specific relevant portions of the program. Semantic coloring can provide an indication of the correctness of a set of code (such as a procedure or function) as well as identify potential problems with code. Conventional compilers, for instance, typically only identify errors based on the syntax. Conventional systems fail to apply a semantic analysis. Semantic coloring preferably operates at real time to enable these types of issues to be addressed as they occur, rather than at the end.

Further, syntax errors do not necessarily prevent embodiments of the invention from applying semantic coloring. In one example, syntactic coloring may be included in the more general semantic coloring scheme. Semantic coloring uses a detailed analysis of the code to apply coloring. For example, nested modules often include functions with a local variable. Often, a user may declare a local variable twice in such a scenario. Semantic coloring can provide an indication that this may be a mistake, even though it may be technically legal in the context of the programming language.

The colors selected for a given issue can identify the issue or the text as an error, or as a potential problem, or as a defined variable, or as an undefined variable, and the like or any other semantic related issue. The semantic treatment can also be used to identify satisfactory code or text as well. The color scheme (or other visual indication or display treatment such as font, font size, font text, bold, italic, underline, strikethrough, flashing, etc.) can also be applied by default or by a user-based selected.

When applying semantic display treatments (referred to herein as semantic coloring although one of skill in the art can appreciate other display treatments as indicated above), the state of the system or of the code can be analyzed with every keystroke in on embodiment. As indicated previously, the speed with which a program is analyzed for semantic coloring can vary. Semantic coloring can be performed with every keystroke, on a periodic basis, or any other manner, whether or not periodic. In addition, semantic coloring can adapt to the program or to where the user is programming. For example, the semantic analysis required to apply semantic coloring when a user is programming inside a procedure may vary from other locations in the code. Often, semantic coloring typically requires enough parsing to have a representation of the code that is sufficient to apply semantic coloring. In some embodiments, functions are evaluated as possible, local and global variables are analyzed, and the like. This analysis enables the coloring to be applied in a manner that considers the program as a whole and in context.

Embodiments of semantic coloring can also consider the code or programming language on a per block level, such as on a per function level, a procedure level, or other programming block or division. Such divisions can also be considered in context of the whole. For example, semantic coloring may be evaluated on a function basis or other type of programming block or module.

Characters will be broadly understood to mean any character or group of characters that are entered into the computer. For example, character shall be understood to apply to individually entered characters as well as to characters that are entered as a group, such as a group of characters that are pasted into a program. Embodiments of the invention provide the ability to determine the effect a character or string of characters has on the categorization of input within a determined scope, such as within a block or module of a program.

In one example the categorizations are updated with each keystroke. Display treatments are associated with each category or a group of categories. The use of different display treatments may allow a user to rapidly determine the effect of entering a character into the program. For example, if the user is attempting to enter a local variable that has been previously declared, the user will know whether the character or group of characters is categorized as a local variable at the moment the character or group of characters is entered by the display treatment applied to the character or group of characters. Such a configuration may help the user to code more confidently and conveniently as the display treatment may provide an indication that input is categorized as the same. The semantic syntax treatment is applied at more than a rote syntactic level by analyzing the scope of the variables to determine the content and context of the input to determine how to apply applicable display treatments to the input. For example, the semantic coloring associated with a local variable "triangle" can vary. As the user begins to type the variable, the text "traing" may be red (or other color which has been defined to indicate that a variable is undeclared). When the user finishes typing "triangle", the semantic analysis will recognize the variable and the coloring will likely change to a color that indicates that the variable has been previously declared.

Embodiments of the invention can be implemented in a wide range of varying applications. Computational software (such as Mathematica), web design, programming languages, web tools, development kits, and the like are examples of systems that benefit from the use of semantic syntax treatment.

FIG. 1 illustrates a computing environment 100 that includes a system 102. The system may include software that can operate in the computing environment 100. The system 102 also represents one embodiment of a computing system that enables the use and interpretation of generalized input. The computing environment 100 may include, by way of example only, a stand alone computer, a network based system (LAN, WAN, Internet, etc.), a peer-to-peer system, or other computing configuration. Embodiments of the invention can be embodied or included in a computer application that can operate as a stand alone application, a client-server based application, a web-based application and the like, or any combination thereof.

In the example illustrated in FIG. 1, the system 102 may include a front end 110 and a kernel 120. A single front end 110 and kernel 120 are illustrated. However, multiple front ends and/or multiple kernels may also be used. Further, the front end 110 and the kernel 120 are not required to operate on the same computer, but can be distributed over a network. Further, the division of processing responsibilities can be allocated between the front end 110 and the kernel 120 in different manners.

The front end 110 is typically configured to allow interaction with users. For example, the front end 110 is configured to receive input. The front end 110 processes the input received from users and transmits the input to the kernel 120. The user interface presented by the front end 110 may have an existing library of input including control objects.

The input may be combined to form a program that may be evaluated to return a result. For example, one implementation of the front end 110 is configured to receive multiple types of input, which may generally include any combination of functions, variables associated with the functions including local variables and global variables, as well as values or other parameters associated with the functions and/or the variables as part of a program.

Local variables include those that have a scope that is restricted to some portion of the program, rather than applying them to the program as a whole as occurs with global variables. Functions frequently operate on local variables within a determined scope such that the use of the local variable within the function may be done without affecting other portions of the program. Accordingly, local variables may be utilized with the functions within the determined scope.

The front end 110 also enables a user to interact with the input while the user enters the program. The input can therefore be manipulated before evaluation of the program. In addition to allowing a user to interact with the input before the input is evaluated, the front end 110 and kernel 120 may cooperate to perform an analysis of the program to perform semantic syntax treatment on the input as the user is entering the input. The input is categorized by determining a likely meaning and context for each string of characters within a local scope or range as individual characters are entered. In particular, the context and content of the input may be analyzed at the entry of each character to categorize the character string at the cursor location as well as the rest of the input within the local scope. The analysis of the data types present in the input are based on a parsed representation of the text, rather than an unparsed or linear text representation.

In one example, an analysis is performed to categorize characters, or strings of characters in particular, into any number of categories. Categories may include, without limitation, independent strings that are unrelated at that moment to other input, global variables, local variables, values, functions, or other categories.

Functions may operate on local variables as well as global variables. In one example, it may be desirable for the correlations of the local variables within a determined local scope to be provided more frequently than when the program is evaluated. In one example, the analysis to categorize the input and apply display treatments to the input is performed on a determined scope as each keystroke entered by the user. In order to categorize local variables, functions within the local scope are identified and the local variables associated with the functions are also identified. To determine the relationships between local variables and other elements within the local scope, the input is parsed to the level that functions, local variables, symbols, and other elements are understood by the system.

In particular, in one example the system 102 processes the input in order to parse the input into binary representations of the input and may form data structures within the system. More particularly, the system 102 parses both the functions and the associated objects into their binary representations. The system 102 then performs computations with the data structures, such as by applying algorithms corresponding to designated functions on the associated objects. One such algorithm includes categorizing the elements as described above.

Another algorithm may include applying a display treatment to each character or string of characters according to the display treatment associated with each category. For example, different categories may be displayed in different colors or have different fonts applied to the associated text or include other visual property that enables a user to recognize the significance of the visual property. As previously introduced, the entire process of categorizing the input and applying display treatments based on the categorization may occur as each character of input is entered. Further, the display treatment can change dynamically as the input is provided.

For example, a local variable of "triangle" may be a certain color (such as red) that reflects that the local variable is not recognized until the user finishes typing all of the variable. Thus, "triang" may be one color that changes to, for example, blue when the input is finished as "triangle", indicating to the user that the variable is recognized. The repeated analysis of the program or of the input as a whole can provide immediate feedback in a visual manner that enables a user to more efficiently code or more efficiently provide input.

Further, each determination is made based on a categorization that includes determining the context and meaning of the input within a predetermined range. Accordingly, a semantic analysis of the input in the program as a whole is conducted in order to determine the display treatments of each of the character strings in the program, rather than merely a linear text-highlighting operation. Such a configuration may allow a user to see quickly how each piece of input affects other parts of the input and vice versa. For example, such a configuration may allow the user to see almost instantly whether the character string at the cursor location matches local variables or other categories.

The user is also able to instruct the system 102 to evaluate the program. The program may be evaluated by the kernel 120. The output of the evaluation (including any objects or functions included or associated therewith) is then returned to the front end 110. The front end 110 organizes the output, determines how to display the output, and causes the output to be displayed. The representation displayed by the front end 110 may also be arbitrarily selected as desired.

Figure 2:
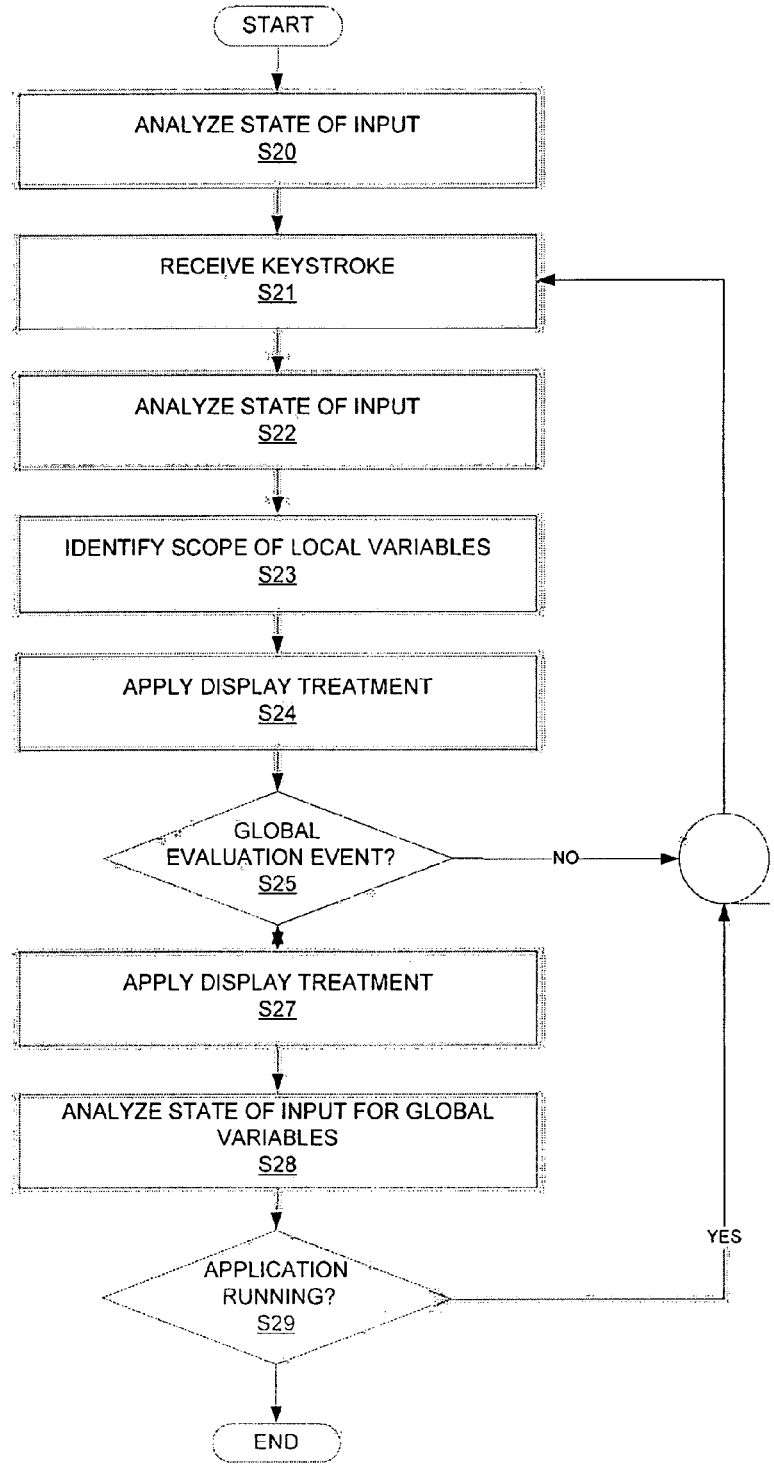
FIG. 2 is a flowchart illustrating one embodiment of applying semantic syntax treatment according to one example.

FIG. 2 is a flowchart illustrating a method of performing dynamic semantic syntax color in substantially real-time. The method begins at S20 by analyzing the state of the input. The input may include an input field in which text, symbols, or other graphical representations that have been previously entered are displayed and on which subsequently input information will be displayed. Thus, semantic analysis is not limited to an analysis of text, but can include an analysis of other types or classes on input that are used with or mixed with text.

The state of the input may initially be analyzed by translating the input into a format suitable for processing in the system. Translating the input may include parsing the input into a binary representation of the data. The binary representations are data structures that include, without limitation, functions as well as objects on which the functions are performed. Accordingly, the method begins by parsing the information to a desired degree, such as to the point that the functions may be evaluated as desired with the corresponding objects. The functions and the objects are processed to the point that both local variables and global variables are identified. Further, the scope of the local variables may also be determined.

With the state of the input determined, the method continues at S21 by receiving a keystroke or other input from a user. For ease of reference, a keystroke will be discussed below as the input received from the user.

Once the keystroke has been received, at S22 the entire input may again be analyzed to determine the new state of the input. Frequently, the input received by the keystroke will add a character to a string of characters or begin a new string of characters at a cursor location. As a result, it may be desirable for the string of characters to provide information as to the state of the string of characters relative to a local scope. Since all of the input is analyzed to determine the new state of the input, relevant changes to the state of the character string at the cursor location will be reflected.

Analyzing the input to determine the state of the input includes identifying the local variables. At S23, the scope of each local variable is identified and the instances of each local variable are correlated. Further, determining the state of the input includes applying grouping rules to parentheses, brackets, and the like to the input as well as applying operational or other rules as desired. Identifying the scope of local variables is one specific example of performing a semantic analysis on the input. As described in more detail below, semantic analysis can include analyzing local variables and their relationships to global variables, focusing on a block level of the input, analyzing the context dependent keywords of functions, identifying the availability of a variable, identifying potential issues, identifying nesting situations and variable issues therein, performing argument counts and identifying compliance or errors, performing scope conflicts, and the like or any combination thereof. The semantic analysis is considerably more complex than a conventional syntax analysis of the input.

Once the state of the local variables and any associated functions, grouping, or other rules have been applied as well as the other rules performed or analysis performed during semantic analysis, at S24 one or more display treatment of the input may be changed as desired. In one example, the color of uncorrelated strings may be assigned one color or group of colors, the color of local variables may be assigned a second color or group of colors, non-variable text, functions that are recognized by the system may be assigned a third color or group of colors, predicted errors may be assigned a fourth color or group of colors, and/or errors that would prevent the function from returning a result may be assigned a fifth color or group of colors. Any number of element types may be represented by any number of colors or groups of colors. Further, other graphical characteristics may be altered, such as the font and/or color of the text.

After the display treatments have been applied, at S25 the method may include determining whether a global evaluation event has occurred. Examples of global evaluation events may include, without limitation, receiving a command from the user to evaluate the input, receiving a hard line return command, and/or detecting that a value has been assigned to one or more global variable. The semantic or display treatment, however, does not necessarily depend on the occurrence of an evaluation event.

If a global evaluation event has occurred (YES, step S25), at step S26 the state of the input is analyzed for correlations within the input for global variables. Thereafter, at step S27 the display treatments of the global variables may be altered, such as by applying a color or group of colors if the global variables have assigned values and assigning another color or group of colors if the global variables do not have assigned values.

If a global evaluation event has not occurred (NO, step S26) or the state of the input has been analyzed for correlations with the global variables and the display treatments have been updated, at step S28 the method includes determining if the application, which is receiving input, is still running. If the application is still running or input can still be provided (YES, step S28), the method continues when a keystroke is received S21. Accordingly, the present method provides for a real-time analysis of local variables as characters are input in order to provide semantic syntax treatment of the input. One example of how display characteristics may be applied by a semantic syntax treatment process will be discussed in detail below.

FIG. 3A is an example of a program that may be used to illustrate a process of semantic display treatment. As previously discussed, various display treatments may be altered. In fact, the semantic treatment may change over time as the code is generated or altered. In the present example, various categories will be depicted in which various fonts have been chosen as the display treatments to be applied to each category of input.

Figure 3C:
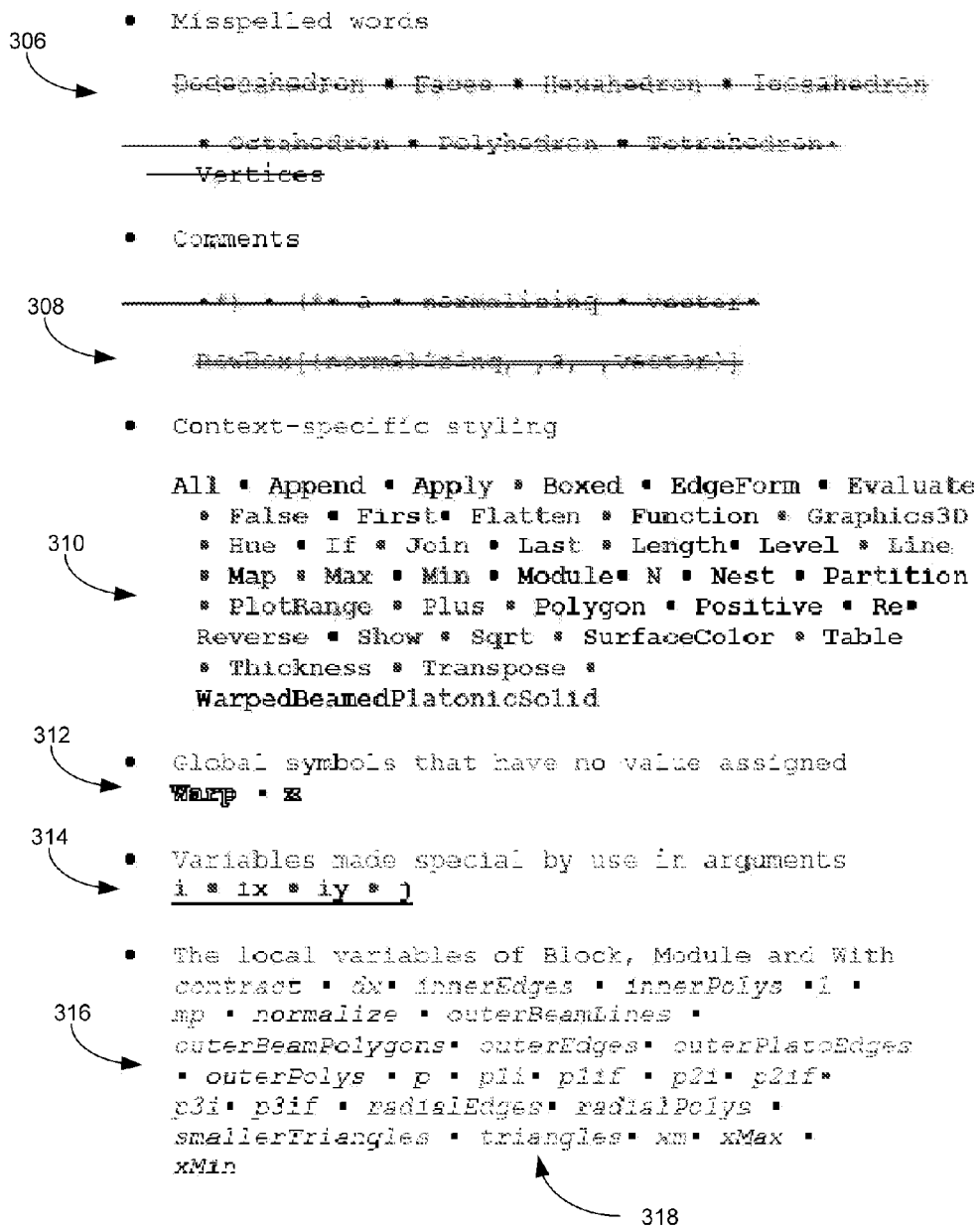

As illustrated in FIG. 3C and FIG. 4C and as applied to FIGS. 3A, 3B, 4A and 4B, input that are categorized as comments are illustrated in double-strike through 308 (~~double-strike-through~~ ), ), input that are that are misspelled words or likely misspelled words are illustrated in strike through 306 ( ~~strike-through~~ ), input categorized as context-specific styling are illustrated in bold 310 ( bold ), input categorized as global or independent variables which have no value assigned are illustrated in boldoutline 312 ( 𝕓𝕠𝕝𝕕𝕠𝕦𝕥𝕝𝕚𝕟𝕖 ), input categorized as variables made special by use in functions are illustrated in bold underline 314 ( boldunderline ), and input categorized as local variables, function arguments, and/or pattern names are illustrated in as 316 italics (*italics*). Categories can also be applied to various aspects of semantic treatment. As discussed in more detail below, a display treatment can be applied to other categories such as argument counts, context dependent keywords, and the like.

Further, categories may be assigned color treatments in conjunction with a font treatment or instead of the font treatment. For example, input categorized as comments may be colored gray. Input categorized as misspelled words may be colored fuscia. Input categorized as context-specific styling may be colored black. Input categorized as global variables which do not have a value-assigned color may be colored blue. Input categorized as variables made special by use in an argument may be colored light blue. Input categorized as local variables, function arguments, and/or pattern names may be colored green. Any combination of color, font, and/or other display treatments may be assigned to any number of categories and may be altered or reassigned as desired.

FIGS. 3A-3C illustrates a program in which the input is categorized. The categorization breakdown is illustrated in FIG. 3C. As illustrated in FIGS. 3A-3C, a local variable "triangle" has been identified at 300 and each instance of "triangle" within the scope of the program is treated as a local variable. The categorization of the local variable "triangle" 318 is also identified with other local variables at 316 in FIG. 3C.

FIGS. 4A and 4B illustrate the effect of changing a keystroke at a cursor location 400 (FIG. 4A). As illustrated, at 400 upon deleting the letter "t" from the word "triangle" such that "riangle" remains, the display treatment applied to the string "riangle" is immediately changed. In particular, in the present example as illustrated at 400 the remaining text, "riangle", is not a local variable. The term "riangle" is included in the category of a global variable that does not have a value assigned and has the corresponding display treatment applied. In this example, the display treatment applied to "riangle" is bold outline—"riangle". The recategorization of the term is applied immediately after the keystroke, such as by parsing the entire block to categorize all of the input as described above, as illustrated at 410 in FIG. 4C. Accordingly, the categorization within the determined scope, which is less generally less than global, may take place as each character is entered.

Figure 5C:
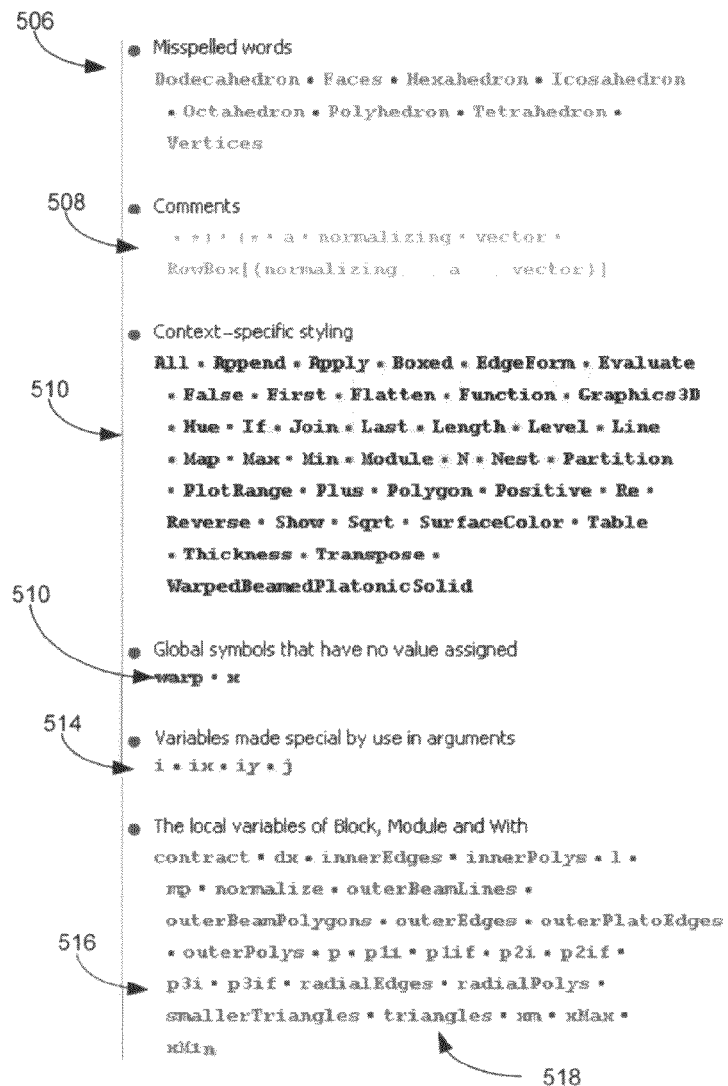

FIGS. 5A-5C illustrate the same scenario illustrated in FIGS. 3A-3C. In this embodiment, the display treatment or the semantic treatment includes color. In one embodiment, color treatments have been applied to each of the categories. For instance, comments 508 are illustrated in gray, misspelled words 506 are illustrated in fuscia, context specific text 510 in black, global or independent variables which have no value assigned 512 in blue, variables made special by use in a function 514 in light blue, and local variables, function arguments, and/or pattern names 516 are illustrated in green. The term triangle along with the corresponding categorization and color treatment are illustrated at 500 and 518.

Figure 6C:
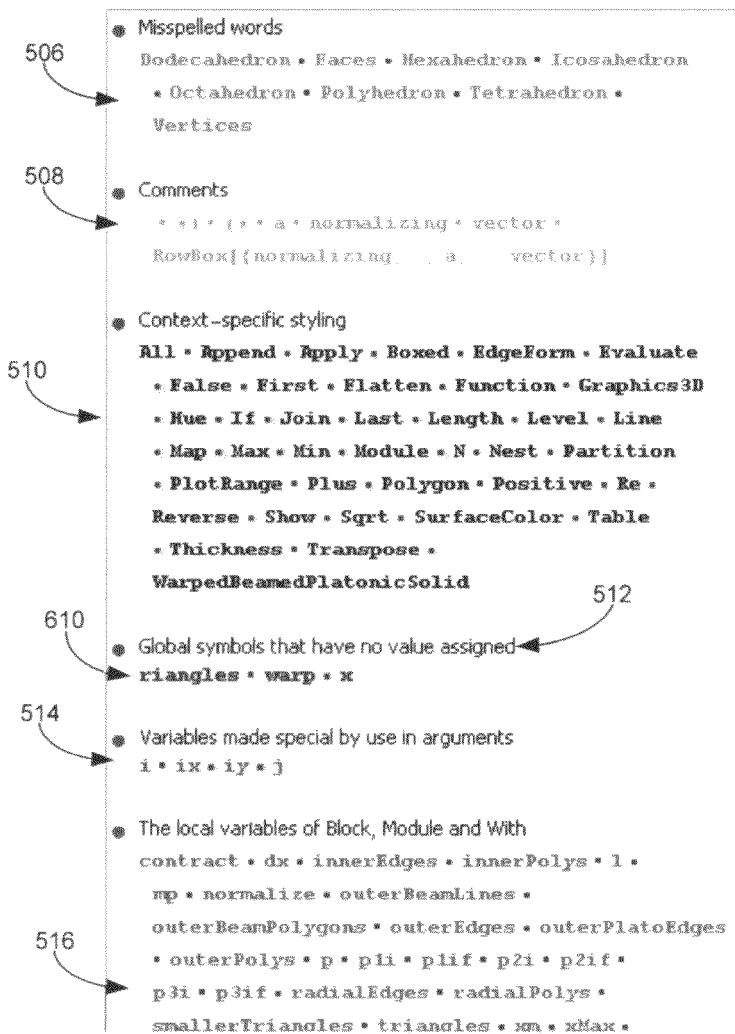

FIGS. 6A-6C illustrate the same scenario illustrated in FIGS. 4A-4C, in which color treatments have been applied to each of the categories in which comments are illustrated in gray, misspelled words are illustrated in fuscia, context specific text in black, global or independent variables which have no value assigned in blue, variables made special by use in a function in light blue, and local variables, function arguments, and/or pattern names are illustrated in green. The term "riangle" along with the corresponding categorization and color treatment are illustrated at 600 and 610.

Semantic coloring can be used, as previously described, to identify errors, to identify positive aspects of the code, and the like. The following description identifies examples of the analysis that may be performed during semantic coloring. These examples illustrate an analysis that is not reflected in conventional syntax analysis. Further, these examples are not intended to be limiting of the invention, but are exemplary in nature. One of skill in the art, with the benefit of the present disclosure, can appreciate the types of analysis applied during semantic coloring as well as the advantages afforded by semantic coloring.

For example, semantic coloring can be applied to argument counts. A plot function, for example, may be represented as sin(x,y). If the sine function is only defined to receive a single argument, then there are too many arguments. Semantic coloring applied to all of sin(x,y) or only to a portion (such as the "y") can alert the user to this type of error. Alternatively, a user may type sin( ) and omit the argument. Semantic coloring can apply argument count analysis in either case. By coloring the input, a user is apprised of certain aspects of the input. In this example of sin( ) or sin(x,y), the user is apprised of an argument count error.

In the case of a variable "triangles" that is spelled "riangle", the user is apprised of the aspect that the variable "riangle" is not recognized, undefined, or available for use, etc. In any case, the user can take appropriate action based on the information obtained from semantic coloring or other display treatment. This example illustrates that semantic coloring is not limited to identifying errors because, in one embodiment, the assumption that the user has made a mistake is not necessarily present. The user may intend to use "riangle" for another variable, for example. Thus, semantic coloring or semantic treatments can provide a user with substantial assistance in preparing and drafting input such as programming code.

Another example of semantic coloring occurs in context dependent keyword coloring. Often, the arguments for a particular function or procedure have specific names. When semantic analysis comes across an improper argument in such a function, then the appropriate coloring can be applied. Global versus local variables, nesting, argument counts, scope conflicts, and the like are examples of the analysis that can be applied during semantic coloring.

In another example, there are colors that can be associated with good or correct aspects of a program. A particular color such as black can suggest that the symbol or character is known. Blue can suggest that the character is not necessarily wrong nor is it necessarily correct. In this sense, blue can suggest possibilities. As described above, semantic coloring is not limited to colors, but can also include font treatments, and the like. Audio feedback is another possibility for semantic treatment.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, or other optical disk storage, magnetic disk storage, or other magnetic storage devices, or any other medium that can be used to carry or store desired program code means in the form of computer-executable instructions or data structures, and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data that cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be implemented in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computing environment, a method for treating display characteristics of input displayed via a user interface in real time, the method comprising:
displaying a first input received via the user interface in real time, wherein the first input includes source code that has at least local variables and global variables, wherein the local variables have a scope that is restricted to a portion of the first input and the global variables have a scope corresponding to all of the first input,
applying a display treatment to at least the source code included in the first input, wherein the display treatment is displayed via the user interface;
receiving a second input from the user interface, wherein the second input includes at least one character;
determining a new state of both the first input and the second input after receiving the second input in real time, wherein determining a new state includes determining a scope of the second input relative to the previously received first input from the user interface including the local variables and the global variables;
updating the display treatment based on the new state of both the first input and the second input,
wherein adjustments in the display treatment are applied to both the first input and the second input as each character is received from the user interface,
wherein changes relevant to the new state of the first input and the second input including changes to the local variables and the global variables are reflected in the display treatment, and
wherein the display treatment is adjusted based on a syntactic and a semantic analysis performed on all the source code including the source code included in the first input and the source code included in the second input.

2. The method of claim 1, further comprising categorizing the first input and the second input into at least one category, wherein categorizing the first input and the second input into at least one category includes identifying the global variables and all locations within the scope of the first input and the second input at which each global variable is declared, referenced or used.

3. The method of claim 2, wherein categorizing the first input and the second input includes categorizing the first input and the second input as at least one of words which are misspelled, as context-specific styling, as global variables which have no value assigned, as variables made special by use in functions, as local variables, function arguments, and as pattern names.

4. The method of claim 2, wherein updating the display treatment includes applying a color corresponding to each category.

5. The method of claim 1, further comprising determining whether a global evaluation event has occurred and analyzing a global scope of the first input and the second input to categorize the first input and the second input into at least a global variable category.

6. The method of claim 1, wherein performing the syntactic and the semantic analysis includes parsing the first input and the second input into functions and variables and determining the scope of the functions.

7. The method of claim 1, wherein performing the syntactic and the semantic analysis includes parsing the first input and the second input into at least one of blocks and modules.

8. The method of claim 1, wherein the first input and the second input is received from a front end and processed by a kernel, wherein the front end and the kernel operate as one of a stand alone application, a web based application, peer to peer application, or a server client application.

9. The method of claim 1, wherein determining a new state of the first input and the second input includes one or more of:
analyzing the first and the second input for context dependent keywords;
analyzing the first and the second input for local variables in nesting sequences;
analyzing the first and the second input for scope conflicts; or
analyzing the first and the second input for argument counts.

10. The method of claim 1, wherein:
The first input and the second input include one or more of symbols, instance variables, class inheritance hierarchies, constants, enums, static variables, class variables, functions, procedures, values, independent strings, or any combination thereof; and
determining a new state of both the first input and the second input includes performing an analysis on the first input and the second, wherein the analysis includes one or more of:
analyzing the local variables and their relationships to global variables;
focusing on a block level of the first input and the second input;
identifying the availability of a variable;
identifying potential issues;
identifying compliance or errors; or
any combination thereof.

11. In a computing environment, a method for treating display characteristics of input displayed via a user interface, the method comprising
determining a state of a first input previously received from the user interface, wherein determining the state includes determining a scope of all the first input and wherein the first input includes first source code having at least local variables and global variables;
applying display treatments to the first input;
receiving a second input that includes second source code that is added to the first source code, wherein the second input includes characters;
determining a new state of both the first input and the second input after receiving the second input, wherein determining the new state includes identifying a scope for the second input relative to the first input previously received from the user interface including the local variables and the global variables;
categorizing the first input and the second input into a plurality of categories, the categories including at least functions and local variables and global variables, wherein the second input is categorized relative to the scope of the second input;
updating the display treatments to reflect the information associated with the functions, the local variables and the global variables, wherein the display treatments are applied to the first input and the second input as each character in the second input is received from the user interface; and
displaying the first input and the second input on a graphical display device with the display treatments on an output device, wherein changes in the display treatments are reflected in at least the second input,
wherein the display treatments are adjusted based on a syntactic and a semantic analysis performed on all the source code including the source code included in the first input and the source code included in the second input.

12. The method of claim 11, wherein categorizing the first input and the second input into a plurality of categories includes identifying the global variables and all locations within the scope of the first input and the second input at which each global variable is declared, referenced or used.

13. The method of claim 11, wherein categorizing the first input and the second input includes categorizing the first input and the second input as at least one of words which are misspelled, as context-specific styling, as global variables which have no value assigned, as variables made special by use in functions, as local variables, function arguments, and as pattern names.

14. The method of claim 11, wherein updating the display treatments includes applying a color corresponding to the function and local variable category.

15. The method of claim 11, further comprising providing access to a user to select the display treatments to be associated with each category.

16. The method of claim 11, wherein updating the display treatments further comprises one or more of:
   analyzing the first input and the second input for context dependent keywords;
   analyzing the first input and the second input for local variables in nesting sequences;
   analyzing first input and the second the input for scope conflicts; or
   analyzing first input and the second the input for argument counts.

17. A system, comprising:
   a user interface including an input device and a graphical output device;
   a front end; and
   a kernel, wherein the front end and the kernel are configured to cooperate to:
      determine a state of a first input previously received from the user interface, wherein the first input includes source code having at least local variables and global variables, each local variable and each global variable having a scope;
      apply at least one display treatment to the first input based on a semantic analysis and a syntactic analysis of the source code included in the first input;
      receive a second input from the user interface, the second input including source code and includes at least one character, wherein the second input is included with the first input,
      determine a new state of the first input and the second input, which includes a scope of the second input relative to the first input previously received from the user interface including the local variables and the global variables, wherein changes relevant to the new state include changes to the local variable and the global variables,
      categorize the first input and the second input into at least one category, and
      apply the at least one display treatment to the first input and the second input associated with the at least one category, wherein the display treatment is updated and applied as each character is received from the user interface and changes relevant to the new state of the first input and the second input are reflected in the at least one display treatment, wherein the at least one display treatment is updated and applied based on a syntactic and a semantic analysis performed on all the source code including the source code included in the first input and the source code included in the second input.

18. The system of claim 17, wherein the system is further configured to identify the global variables and to apply a display treatment to the global variables.

19. The system of claim 17, wherein the front end is further configured to serialize the at least one display treatment and to display the output in a graphical format on a graphical output device.

20. The system of claim 17, wherein the wherein the front end and the kernel are configured to cooperate to apply the at least one display treatment that includes applying a color treatment to text.

21. The system of claim 17, wherein the kernel determines the at least one display treatment by performing one or more of:
   analyzing the first input and the second input for context dependent keywords;
   analyzing the first input and the second input for local variables in nesting sequences;
   analyzing the first input and the second input for scope conflicts; or
   analyzing the first input and the second input for argument counts.

* * * * *